US008672684B2

(12) United States Patent
Ray

(10) Patent No.: US 8,672,684 B2
(45) Date of Patent: Mar. 18, 2014

(54) SHAKEN BABY SYNDROME EDUCATIONAL DOLL

(75) Inventor: Nena R. Ray, Indianapolis, IN (US)

(73) Assignee: RealityWorks, Inc., Eau Claire, WI (US)

(*) Notice: Subject to any disclaimer, the term of this patent is extended or adjusted under 35 U.S.C. 154(b) by 0 days.

(21) Appl. No.: 13/596,289

(22) Filed: Aug. 28, 2012

(65) Prior Publication Data

US 2012/0322040 A1    Dec. 20, 2012

Related U.S. Application Data

(63) Continuation of application No. 10/227,961, filed on Aug. 26, 2002, now abandoned.

(60) Provisional application No. 60/316,043, filed on Aug. 30, 2001.

(51) Int. Cl.
*G09B 23/28* (2006.01)

(52) U.S. Cl.
USPC ............ 434/262; 434/270; 434/272; 434/267

(58) Field of Classification Search
USPC .......................... 434/262, 267, 270, 268, 272
See application file for complete search history.

(56) References Cited

U.S. PATENT DOCUMENTS

| | | | |
|---|---|---|---|
| 1,951,422 A | 3/1934 | Klemperer | |
| 2,988,823 A | 6/1961 | Rosenbloom | |
| 3,027,655 A | 4/1962 | Alderson | |
| 3,154,881 A | 11/1964 | Elwel | |
| 3,568,333 A | 3/1971 | Clark | |
| 4,075,782 A | 2/1978 | Neuschatz | |
| 4,087,933 A | 5/1978 | Strongin | |
| 4,451,911 A | 5/1984 | Klose et al. | |
| 4,575,351 A | 3/1986 | Gonzalez | |
| 4,820,236 A | 4/1989 | Berliner et al. | |
| 4,850,876 A | 7/1989 | Lutaenko et al. | |
| 5,259,764 A | 11/1993 | Goldsmith | |
| 5,277,644 A | 1/1994 | Osborne et al. | |
| 5,356,295 A | 10/1994 | Grosz | |
| 5,443,388 A | 8/1995 | Jurmain et al. | |
| 5,468,172 A | 11/1995 | Basile | |
| 5,509,810 A | 4/1996 | Schertz | |
| 5,516,322 A | 5/1996 | Myers | |
| 5,805,665 A | 9/1998 | Nelson et al. | |
| 5,853,292 A * | 12/1998 | Eggert et al. ............... | 434/262 |
| 6,048,209 A | 4/2000 | Bailey | |

(Continued)

OTHER PUBLICATIONS www.dontshake.com sbsquestions.html. "The National Center on Shaken Baby Syndrome" Jan. 28, 2003.

*Primary Examiner* — Robert J Utama
(74) *Attorney, Agent, or Firm* — Sherrill Law Offices, PLLC

(57) ABSTRACT

A doll for educating caregivers about Shaken Baby Syndrome comprises a head portion, a body, and may comprise transparent skin. The head portion may have a simulated brain disposed therein. The head portion is floppably connected to the body. The doll may further comprise a first chamber and a second chamber containing simulated blood, the simulated blood being visible in the first chamber after acceleration experienced during a shaking episode, but otherwise being concealed from view in the second chamber. A plurality of acceleration sensors may be disposed within the doll to detect acceleration experienced during a shaking episode, and the plurality of acceleration sensors may trigger warnings to the caregiver when portions of the doll experience acceleration sufficient to endanger an infant.

5 Claims, 2 Drawing Sheets

(56) References Cited

U.S. PATENT DOCUMENTS

| | | |
|---|---|---|
| 6,077,083 A | 6/2000 | Smith-Whitley et al. |
| RE36,776 E | 7/2000 | Jurmain et al. |
| 6,148,233 A * | 11/2000 | Owen et al. .................. 607/5 |
| 6,159,017 A | 12/2000 | Coomansingh |
| 6,165,038 A | 12/2000 | Muller |
| 6,193,519 B1 * | 2/2001 | Eggert et al. .................. 434/262 |
| 6,238,215 B1 | 5/2001 | Jurmain et al. |
| 6,301,502 B1 * | 10/2001 | Owen et al. .................. 607/5 |
| 6,425,764 B1 | 7/2002 | Lamson |
| 6,428,321 B1 | 8/2002 | Jurmain et al. |
| 6,428,323 B1 | 8/2002 | Pugh |
| 6,454,571 B1 | 9/2002 | Jurmain et al. |
| 6,527,618 B1 | 3/2003 | Faunda et al. |
| 6,997,718 B1 * | 2/2006 | Boettcher et al. .......... 434/262 |
| 8,137,110 B2 * | 3/2012 | Sakezles .................. 434/267 |

* cited by examiner

SHAKEN BABY SYNDROME EDUCATIONAL DOLL

BACKGROUND

Shaken Baby Syndrome, or Shaken Infant Syndrome, occurs when caregivers shake an infant forcefully. Shaken Baby Syndrome can cause a wide range of serious health problems, including broken bones, blindness, spinal injury, brain damage, and death. When the infant is shaken, it can cause internal bleeding inside the brain that can go undetected. It is therefore important to take an infant who has been shaken to a hospital or doctor in order to prevent severe permanent injury.

The problem of Shaken Baby Syndrome is beginning to draw more attention. Doctors and other healthcare professionals are beginning to study more thoroughly the causes and effects of Shaken Baby Syndrome. In September of 2001, an international conference was held in Sydney, Australia to help healthcare professionals to disseminate and to learn information about Shaken Baby Syndrome.

Shaken Baby Syndrome often occurs when caregivers are left alone with an infant who is engaging in some behavior that is frustrating to the caregiver. For example, despite the caregiver's best efforts to determine what is wrong, the infant will not stop crying. In such situations, caregivers may shake the infant in a misguided attempt to stop the frustrating behavior.

Caregivers can learn to cope with the stress of a crying infant, though. It is important to educate them about the danger of Shaken Baby Syndrome so that they may take appropriate measures to prevent or deal with frustration and stress. By preventing or dealing effectively with frustration and stress, the caregiver can prevent Shaken Baby Syndrome.

Surprisingly mild shaking can cause Shaken Baby Syndrome. The membrane that secures the brain to the skull does not generally develop until 18 months of age, and therefore infants younger than this are particularly vulnerable to Shaken Baby Syndrome. It is also important to educate caregivers of this fact, both in order to help prevent them from shaking an infant even mildly, and in order to encourage them to seek medical care immediately for the infant in the event of such a shaking, so that any injury is not aggravated by going untreated.

SUMMARY OF THE INVENTION

The present invention addresses the problems discussed above with an educational doll capable of serving as an instructional tool to show caregivers how shaking can cause internal bleeding and other injuries associated with Shaken Baby Syndrome, and in particular to show them that relatively mild shakings can potentially cause serious, permanent injury.

Provided is a doll and method of use, comprising in one embodiment a head portion floppably connected to a body, and an acceleration sensor connected with the doll that may trigger a warning when the doll is shaken. More than one acceleration sensor may be connected with, for example, the head portion and/or the body of the doll. The warnings may comprise any means that warns a user, including visual, audio, and tactile elements, such as, for example, light, sound, and vibration. Alternatively or in conjunction with other warnings, a warning may comprise text, such as, for example, text that indicates an injury caused when the doll is shaken.

The head portion of the doll may encompass a simulated brain. In one embodiment at least part of the head portion is at least partially transparent and reveals at least a portion of the simulated brain. In the embodiment including a simulated brain the warning may include a visual element, such as, for example, light, emanating from the simulated brain. Light as a visual element may be generated in part by, for instance, one or more Liquid Crystal Displays and/or Light Emitting Diodes, and at least a portion of the light may be transmitted at least partially through one or more fiber optic cables. Such a visual element may emanate from an area of the simulated brain injured when the doll is shaken, and may, for example, include text indicating an injury caused when the doll is shaken. Such text may identify a function of a portion of a human brain in a corresponding position to the area of the simulated brain injured when the doll is shaken, such that a user can identify potential mental impairment that can result when an infant is shaken.

In another embodiment that can be used separately or in conjunction with the above embodiments, a doll is provided, comprising first and second chambers disposed within the doll. At least a portion of the first chamber is at least partially transparent and disposed to permit viewing of the contents of the first chamber. The second chamber contains simulated blood and is in fluid communication with the first chamber through one or more acceleration-sensitive connections. The one or more acceleration-sensitive connections prevent the simulated blood from passing from the second chamber to the first chamber absent acceleration exceeding a pre-selected threshold.

Alternatively or in conjunction with either of the above embodiments, a label may be provided for the acceleration sensor and/or for the first chamber. Such a label may identify a function of a portion of an infant's anatomy in a corresponding position to the acceleration sensor and/or first chamber, respectively, such that a user can identify potential physiological consequences to an infant when the doll is shaken.

In another embodiment either separate or combined with the above embodiments, a doll is provided comprising a head portion floppably connected to a body and a plurality of acceleration sensors disposed among the head portion and the body. Each of the plurality of acceleration sensors may have an output circuit upon which an output signal is placed when the doll is shaken, and each output signal may be indicative of the magnitude of acceleration experienced by each acceleration sensor. The doll may also comprise a CPU having the output circuits from the plurality of acceleration sensors as input. The CPU may be programmed with a set of injury criteria that correlate accelerations experienced by portions of human anatomy positioned correspondingly to the plurality of acceleration sensors with injury thereto. The CPU may be further programmed to output warning signals corresponding to the output signals of the plurality of acceleration sensors. A plurality of warning devices may be operatively connected to the CPU, the plurality of warning devices providing warnings corresponding to the warning signals output by the CPU. Such a doll may further include a simulated brain and nervous system disposed within the head portion and the body, and a transparent skin through which the simulated brain and the nervous system are visible.

The doll of the above embodiment may further comprise first and second chambers disposed within the doll, where at least a portion of the first chamber is at least partially transparent and disposed to permit viewing of the contents of the first chamber. The second chamber may contain simulated blood and be in fluid communication with the first chamber through one or more CPU-controlled valves. The one or more CPU-controlled valves may prevent the simulated blood from passing from the second chamber to the first chamber absent a warning signal output by the CPU to the one or more CPU-controlled valves.

Alternatively or in conjunction with any of the above embodiments, a doll is provided comprising a head portion floppably connected to a body, and simulated blood that visibly appears in an area of the doll that has experienced acceleration sufficient to cause internal bleeding to a corresponding area of an infant's anatomy. The simulated blood may comprise, for example, an electronic display, or a liquid crystal display.

A method of learning about Shaken Baby Syndrome is also provided. The method includes shaking a doll, the doll comprising a head portion floppably connected to a body, and an acceleration sensor connected with the doll that may trigger a warning when the doll is shaken. The method may also include causing the acceleration sensor connected with the doll to trigger the warning. Further steps may include evaluating the warning to determine potential physiological effects of corresponding shaking of an infant, and/or performing said steps in furtherance of a legal proceeding.

DESCRIPTION OF THIS EMBODIMENT

Figure 1:
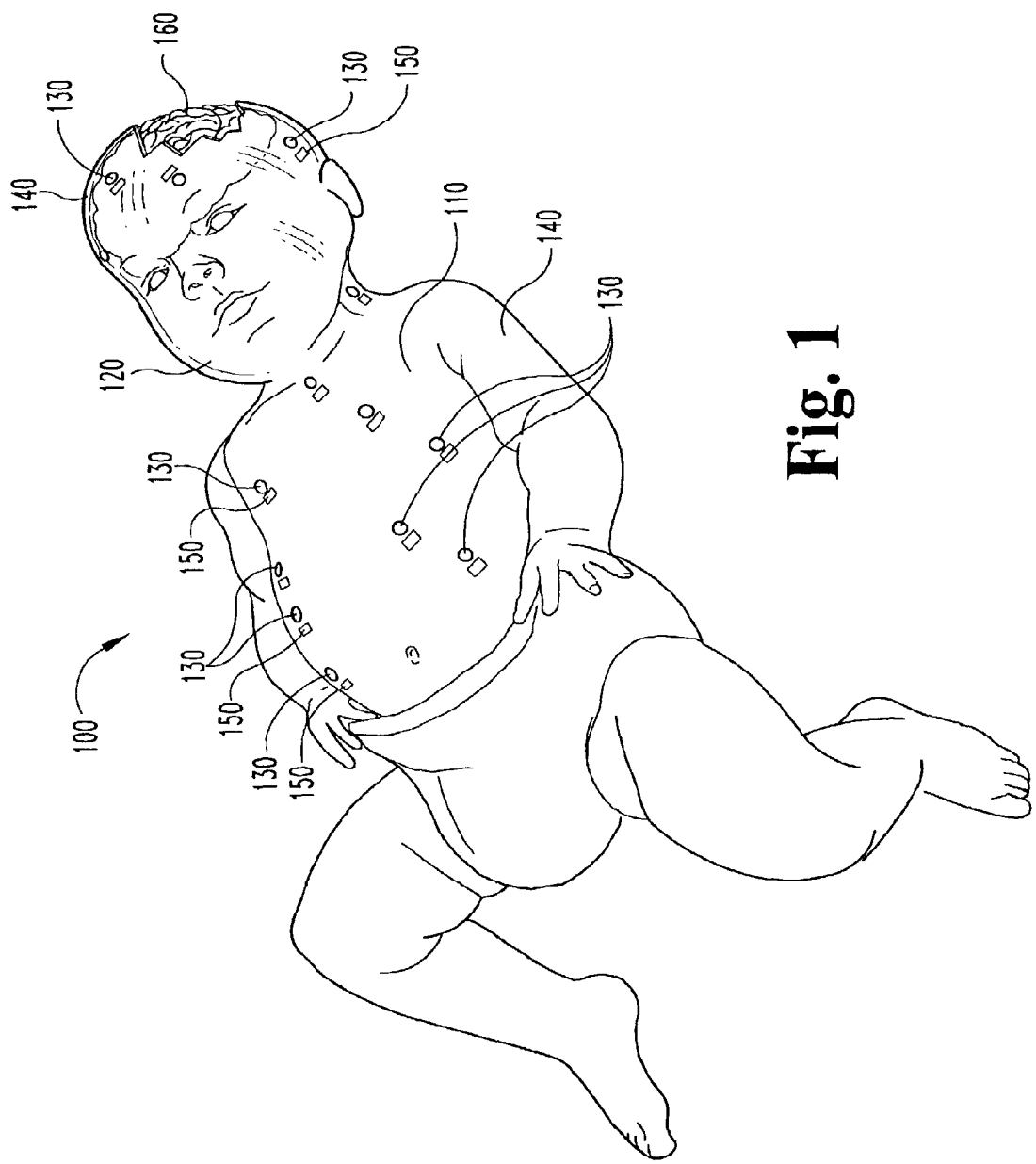
FIG. 1 is a perspective view of a doll according to the present invention.

For the purposes of promoting an understanding of the principles of the invention, reference will now be made to the embodiment illustrated in the drawings and specific language will be used to describe the same. It will nevertheless be understood that no limitation of the scope of the invention is thereby intended, and alterations and modifications in the illustrated device, and further applications of the principles of the invention as illustrated therein, are herein contemplated as would normally occur to one skilled in the art to which the invention relates.

FIG. 1 shows a Shaken Baby Syndrome educational doll according to the present invention, shown generally at 100. The educational doll 100 according to the present invention comprises a body 110 and head 120 and may be covered with transparent or translucent skin 140. Alternatively, the head 120 may be formed at least partially from a transparent material, such as acrylic, without skin 140. The head 120 is floppably connected to the body 110 by a flexible neck or other joint, so that the head 120 is free to flop around relative to the body 110. In one embodiment the head 120 may only flop forward and backward relative to the body 110. In another embodiment the head 120 may only flop side-to-side relative to the body 110. In other embodiments various combinations of the above movements are contemplated, including movement in all directions. It will be appreciated that this freedom in the floppable connection preferably simulates the anatomy of real infants, which are unable to support their own heads against even a single gravity of acceleration, much less the multiple gravities experienced during a shaking episode.

In one embodiment, the head 120 of the doll 100 contains a simulated brain 160 that is visible through the transparent skin 140 of the doll 100. The brain 160 may be rubber and may be formed as part of the body 110. One embodiment of the doll further comprises a simulated spinal cord and simulated nerves extending from the spine and brain 160 to the limbs of the doll 100. The simulated nerves and spinal cord may also be visible through the transparent skin 140 of the doll 100. In this embodiment, the body 110 also contains simulated blood that can simulate internal bleeding. The simulated blood is preferably liquid and preferably red, but it will be appreciated that any substance and color suitable to simulate internal bleeding may be used, including by way of example and not of limitation, gel, powder, liquid crystal displays, etc.

The head 120 of this embodiment doll also contains a number of lights 130 positioned in different locations throughout the head 120, with associated labels 150 describing the portion of the brain and/or the function of the brain at that location. Light Emitting Diodes ("LEDs") can advantageously be used for these lights 130, as they are durable and require little power. Fiber optic means, such as cables, may be used to transmit light. In conjunction with the lights 130, the labels 150 permit identification of the brain subsections and/or brain functions that are typically performed in the brain subsection found at the corresponding location, such as, for example, speech or memory.

When the doll 100 is shaken, the floppable connection between the body 110 and the head 120 permits the head 120 to experience acceleration similar to the acceleration that an infant's head would actually experience during shaking. The shaking action causes lights 130 to illuminate in the head 120 corresponding to the locations experiencing force sufficient to potentially cause internal bleeding and/or brain damage. In this way, a caregiver can shake the doll 100 and then observe which part or parts of an infant's brain could have been damaged by the shaking, as well as the lasting harm to brain function that such a shaking would most likely cause if left untreated.

According to one embodiment, a method is provided for learning about Shaken Baby Syndrome. Such a method may involve the use of a doll 100, where the doll 100 comprises a head 120 floppably connected to a body 110, and an acceleration sensor (not shown) connected with the doll 100. The acceleration sensor triggers a warning or other indicia when the doll 100 is shaken. One method of using such a doll 100 to learn about Shaken Baby Syndrome comprises shaking the doll 100 sufficiently to cause the acceleration sensor connected with the doll 100 to trigger a warning. Such a method may further comprise evaluating the warning to determine potential physiological effects of corresponding shaking of an infant. In one embodiment, the above method(s) is/are applied in furtherance of a legal proceeding, for instance to provide evidence of damage that may or may not occur for a given shaking. Those of skill will recognize that a legal proceeding for which information of the type provided by the doll 100 could be useful includes by way of example and not of limitation, a criminal and a non-criminal investigation, a social work investigation, a statistical analysis, an indictment, a trial, and hospital recordkeeping, among other proceedings.

In one embodiment, the shaking action also releases the simulated blood to simulate internal bleeding and other injuries caused by the shaking action. The simulated blood is preferably stored in a blood system comprising a first compartment and a second compartment. There can be any number of first compartments and second compartments, including one. Simulated blood in a first compartment is visible through the transparent skin 140 of the doll, whereas when said simulated blood is contained within a second compartment, said simulated blood is concealed from view. Opening valves or otherwise permitting the simulated blood to flow from the second compartment into the first compartment can simulate internal bleeding. Simulated blood in the second compartment may be concealed either by making the second compartment opaque or by disposing it within an interior portion of the doll that is not visible through the transparent skin 140.

In an alternative embodiment, the shaking action activates at least one liquid crystal display (LCD) visible through the transparent skin 140 to simulate internal bleeding and other injuries caused by the shaking action. In yet another preferred embodiment, the doll 100 comprises opaque skin 240 with LEDs or other appropriate output devices extending therethrough.

Figure 2:
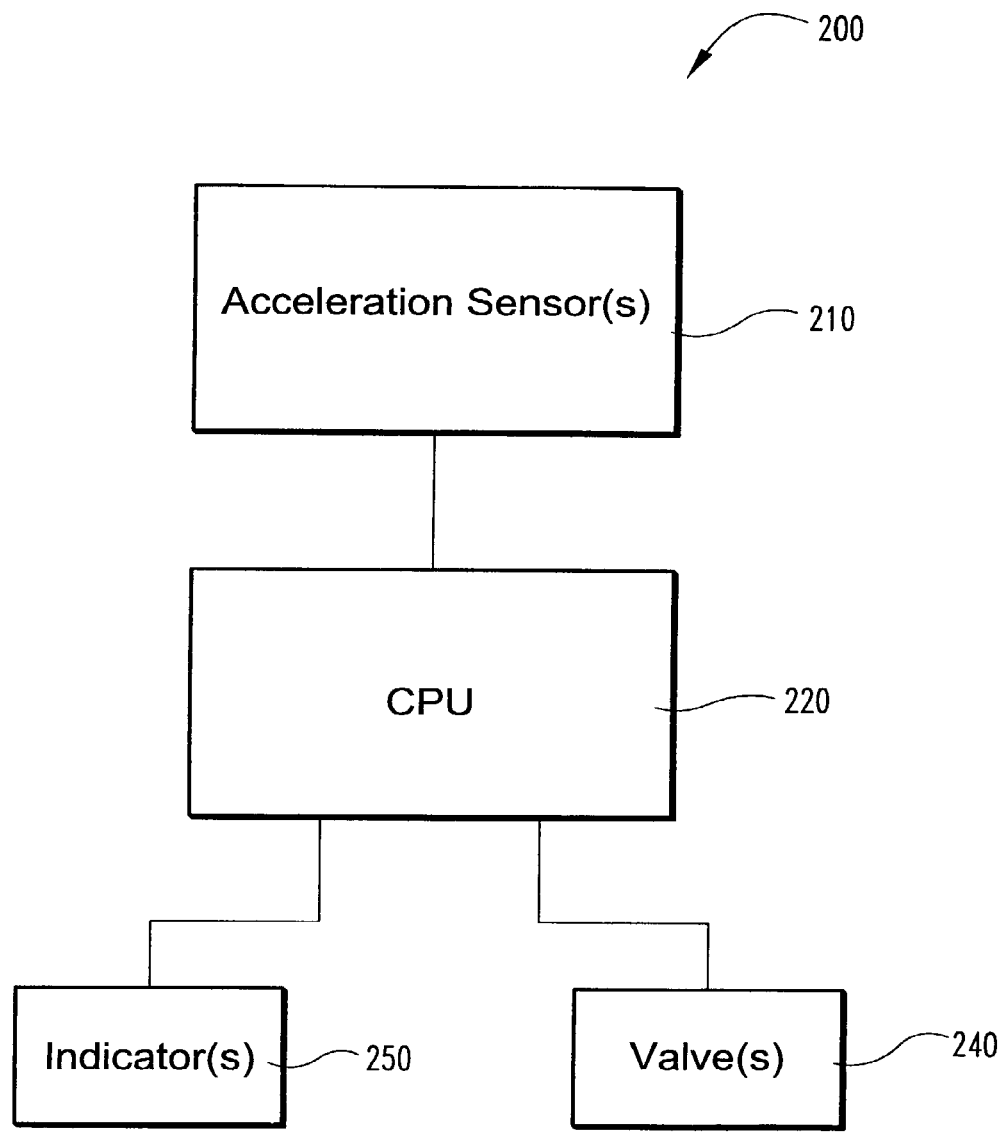
FIG. 2 is a block diagram of certain elements of a system suitable for controlling the lights and valves of a Shaken Baby educational doll according to the present invention.

It will be appreciated by the skilled artisan that any suitable visual, audio, or tactile indicia or warning may be used to warn a user when the doll has experienced acceleration above a pre-selected threshold (the terms warning and indicia are used interchangeably). Therefore, further alternate embodiments employ one or more indicia or warnings selected from the foregoing group of indicia, and the term light 130 should be understood to refer to and include one or more indicia selected from this group of indicia. The responses of the doll to shaking can be controlled in a number of ways. In certain embodiments, the doll includes a number of acceleration sensors controlled by a Central Processing Unit ("CPU") to monitor the positive accelerations and negative accelerations (i.e., decelerations) experienced by various locations within the doll. FIG. 2 is a block diagram of a system suitable for use in such embodiments, which system is shown generally at 200.

In response to signals from the acceleration sensor(s) 210, the CPU 220 can issue commands to indicator(s) 250 to, for example, light the corresponding light 130 when a location within the head 120 experiences acceleration sufficient to cause brain damage or internal bleeding in the brain 160. Likewise, the CPU 220 can issue commands to indicator(s) 250 to, for example, light the corresponding light 130 when a location within the body 110 experiences acceleration sufficient to cause internal organ damage. The CPU 220 can issue commands to open valve(s) 240 to permit the simulated blood to enter at least one visible compartment from at least one concealed compartment when an acceleration sensor 210 in a location indicates that said location has experienced acceleration sufficient to cause internal bleeding at said location.

Although one embodiment employs accelerometers having identical outputs per unit of acceleration, those of skill in the art will note that the acceleration necessary to cause injury may actually vary from location to location throughout the body 110. Therefore, different acceleration sensor(s) 210, or acceleration sensor(s) 210 having a variable output that can be interpreted by the CPU 220, may be used in order to vary the doll's response to acceleration at each of the monitored locations.

Alternatively, a passive monitoring system can be used to activate the visual, audio, and/or tactile warnings and to cause the simulated internal bleeding. In such a system, for example, valve(s) 240 separating concealed and visible simulated blood compartments may be mechanically controlled.

Or, instead of valve(s) 240, membranes that are permeable above certain accelerations or that can be deformed by sufficient acceleration could separate the two types of compartments. Similarly, the lights 130 in the doll's head 120 may each have an associated acceleration sensor 210 that is triggered by a certain acceleration. Once triggered, the light 130 continues to shine until the associated acceleration sensor 210 is manually reset.

Examples of acceleration sensing means suitable for incorporation into a doll according to the present invention include accelerometers, piezoelectric crystals, any type of acceleration-sensing transducer, and the like. Some examples are included, for example, in U.S. Pat. No. 5,924,674 to Hahn et al., and in U.S. Pat. No. 6,055,858 to Muenzel et al., which references are hereby incorporated herein in their entireties. Further, the specifications of U.S. Pat. No. 3,027,655 to Alderson regarding CPR mannequins, and U.S. Pat. No. 6,048,209 to Bailey and U.S. Pat. No. 5,443,388 to Jurmain et al. regarding educational dolls for caregivers of infants are also hereby incorporated herein in their entireties.

While the invention has been illustrated and described in detail in the drawings and foregoing description, the same is to be considered as illustrative and not restrictive in character, it being understood that only this embodiment, and certain other embodiments deemed helpful in further explaining how to make or use this embodiment, have been shown. All changes and modifications that come within the spirit of the invention are desired to be protected.

I claim:
1. A doll, comprising:
   a) a body;
   b) a head floppably connected to the body;
   c) an anatomically accurate portrayal of a human brain retained within and viewable through the head;
   d) at least one visual indicator;
   e) at least one acceleration sensor in electrical sensor communication with the visual indicator operable for generating a visual signal from the respective indicator when the doll is subjected to treatment that could case Shaken Baby Syndrome in an infant subjected to such treatment,
   f) the visual signal represented on the anatomically accurate human brain and the label located proximate the visual signal so as to intuitively convey a brain injury resulting in an adverse impact to the brain function identified on the associated label.

2. The doll of claim 1, wherein the at least one acceleration sensor is retained within the head.

3. The doll of claim 1, wherein the visual signal insinuates an injury to the brain.

4. The doll of claim 1, wherein the visual signal comprises text.

5. The doll of claim 4, wherein the text identifies a function of a human brain which is impacted by the represented injury to the brain.

* * * * *